United States Patent [19]

Peters et al.

[11] 4,367,144
[45] Jan. 4, 1983

[54] FLUID STRAINER OR FILTER

[75] Inventors: Alex R. Peters; Stephen O. Blaydes, both of Worksop, England

[73] Assignee: Dosco Overseas Engineering Limited, Newark, England

[21] Appl. No.: 197,708

[22] Filed: Oct. 16, 1980

[51] Int. Cl.³ .............................................. B01D 35/14
[52] U.S. Cl. ...................................... 210/234; 210/235
[58] Field of Search ......................... 210/235, 234, 238

[56] References Cited

U.S. PATENT DOCUMENTS 2,793,752  5/1957  Jay ..................................... 210/234 X
3,912,630 10/1975  Reighand ........................ 210/234 X

FOREIGN PATENT DOCUMENTS 1516182  6/1978  United Kingdom ................ 210/235

Primary Examiner—John Adee
Attorney, Agent, or Firm—Charles E. Brown

[57] ABSTRACT

The invention relates to strainers or filters, particularly such oil strainers of the type which have removable filter elements held, against spring bias in a casing.

Figure 1:
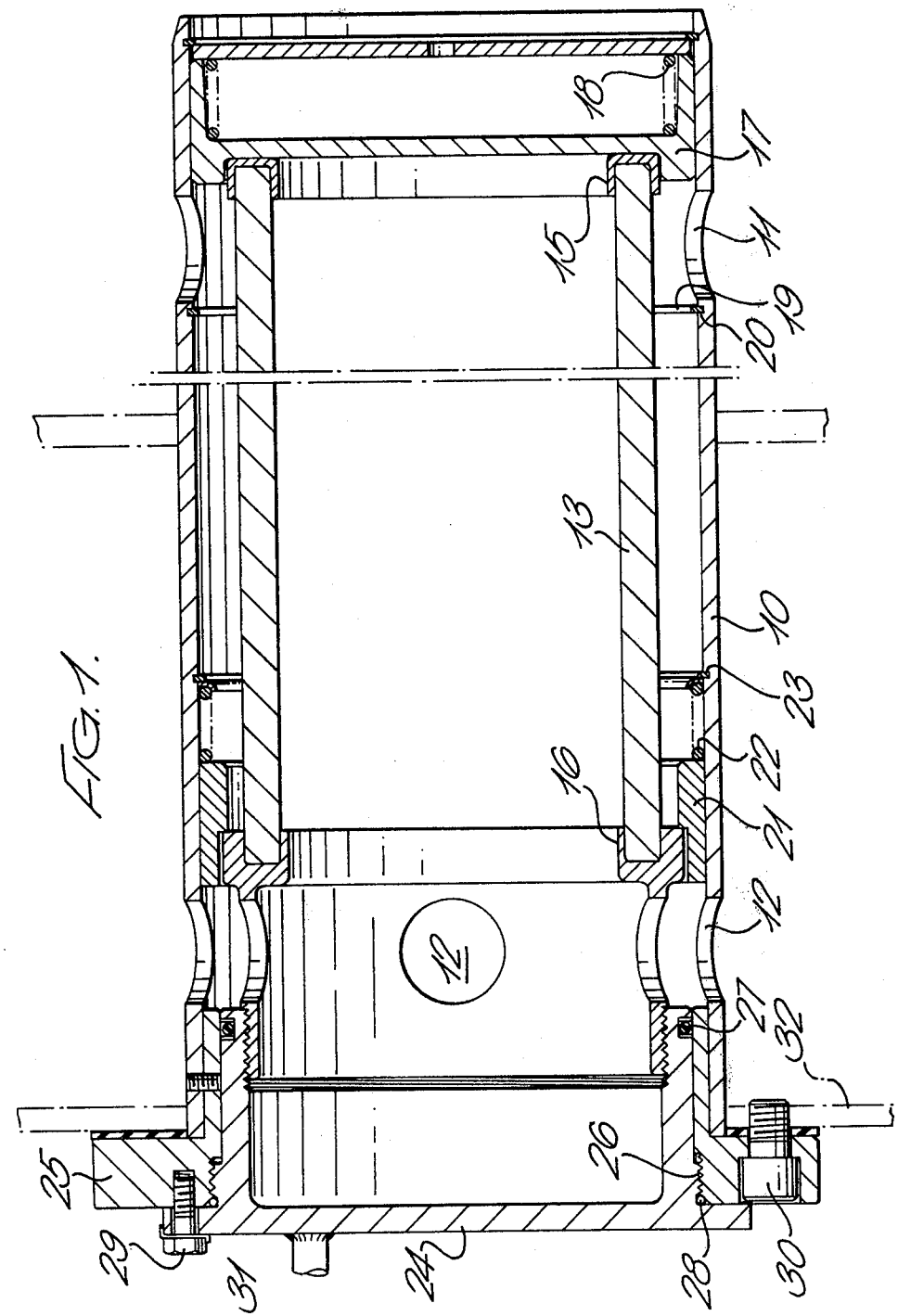

As shown in FIG. 1 the strainer comprises a casing 10 with inlet apertures 11 and outlet apertures 12. Spring biased shutters 17 and 21 are held in their open positions (as illustrated) by the filter element 13 when the closure cap 24 is screwed down.

On removal of the filter element 13 the springs 18 and 22 cause shutters 17 and 21 respectively to close the inlet and outlet apertures automatically.

4 Claims, 2 Drawing Figures

FLUID STRAINER OR FILTER

This invention relates to a fluid strainer or filter. The term strainer will be used hereinafter but is intended to encompass a filter or a strainer.

Filters are known which consist of a casing with an inlet and outlet for fluid and a filter member inserted into the casing against spring bias.

It is also known to have such filters in which, when the filter is removed the inlet and outlet port can be closed.

An object of this invention is to provide a simplified construction of filter which automatically operates to ensure that shutters move to close the inlet and outlet ports on removal of the filter element.

According to the present invention a strainer or filter comprises a strainer or filter element removably located in a casing, inlet and outlet apertures in the wall of the casing, a first spring biased shutter adapted to open and close the inlet aperture to the casing, a second spring biased shutter adapted to open and close the outlet aperture of the casing, the two shutters being separate and both being held open against spring bias by the strainer or filter element when in its normal operative position in the casing, but automatically moving to their closed positions on removal of the element whereby flow of fluid through the casing is prevented during removal of the filter element.

The filter element is preferably supported within the casing by a ring at each end which can be removed with the filter element. Preferably the ring at the outer end of the casing is adapted to abut a closure member for the casing so that when the closure member is screwed into its fully closed position it moves the filter element together with its upper and lower rings down against spring bias thereby opening both shutters simultaneously.

Preferably the closure member is in the form of a cap with a quick start thread which engages a corresponding thread on the upper ring supporting the filter element.

The closure member may be held in position by a bolt or screw and may include removable locking means to prevent inadvertent removal of the closure member.

The casing preferably includes stop members to prevent the shutters from moving beyond a predetermined distance when the filter element is removed from the casing.

Figure 2:
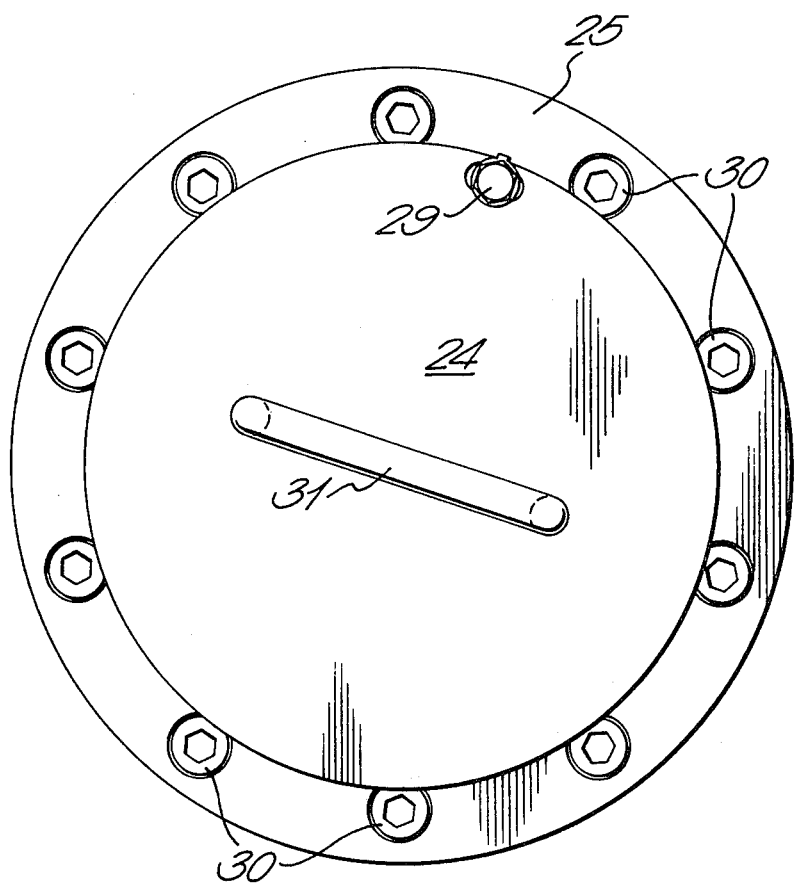

In the accompanying drawing,

FIG. 1 is a vertical section through a strainer or filter embodying the present invention; and FIG. 2 is a plan view of the same strainer.

The strainer shown in FIG. 1 is of the type shown as an oil suction strainer which is adapted to be immersed in the oil or other liquid to be strained and to suck the oil through the inlet aperture in the casing, through the filter element, and out through the outlet aperture.

The strainer comprises a casing 10 which has inlet apertures 11 and outlet apertures 12. Clearly there could be a row of such apertures all round the exterior of the casing.

Within the casing is a filter element 13 supported at one end by a ring 15 and at the other end by an elongated ring structure 16.

A shutter 17 of annular form is provided to open and close the apertures 11 and is biased towards the closing position by a spring 18. As shown in FIG. 1, the shutter is in the open position leaving the apertures 11 clear. Movement of the shutter 17 is limited by a ring 19 let into groove 20 in the wall of the casing 10.

There is a second shutter 21 which is biased by spring 22 towards its closing position in which it closes the ring of apertures 12. The spring 22 is retained in position by a ring 23 let into the wall of the casing 10.

The filter 13 is retained in the position shown by an end closure cap 24 which is screwed into a mounting flange 25 secured to the top end of the casing 10.

The closure member 24 is attached to the mounting flange 25 by a quick start thread 26 and is sealed against egress of fluid by sealing rings 27 and 28.

The closure member 24 is held in place by a hexagon headed bolt 29 and the mounting flange 25 is attached to fixed structure 32 by a row of bolts 30. The closure member 24 had a handle 31 to enable it to be removed from the filter casing.

When the filter 13 is to be removed for cleaning or replacement the bolt 29 is undone and the closure member 24 unscrewed by means of handle 31 so that the filter together with the members 16 and 15 can be withdrawn. This withdrawal allows the springs 18 and 22 to move shutters 17 and 21 to positions where they close respective inlet and outlet apertures 11 and 12. Thus as the closure member 24 is removed and the filter element withdrawn the shutters automatically close off the inlet and outlet to the casing.

The filter 13 can either be supported by a cage or it can act as its own structural support so that the two end members 15 and 16 and the filter 13 together form the removable element.

We claim:

1. A strainer or filter comprising a casing, a strainer or filter element removably located in the casing, inlet and outlet apertures in the wall of the casing, a first spring-biased shutter located in the casing to open and close the inlet aperture in the wall of the casing, a second spring-biased shutter adapted to open and close the outlet aperture in the wall of the casing, each shutter being operable independently of the other and each shutter having a respective compressive spring-bias means for separately urging each shutter in the same direction to a normally closed position, each shutter being held in the open position against compressive spring bias of the respective spring-bias means by the strainer or filter element when positioned in the casing, the shutters being automatically moved to their normally closed positions by the spring bias on removal of the element, whereby flow of fluid through the casing is prevented during removal of the filter element, said casing having an open end closed by a removable closure member, and said closure member in its casing closing position moving said element and both of said spring bias means to simultaneously move said shutters to open positions.

2. A strainer or filter according to claim 1 comprising a ring located at each end of the element, each ring being engageable with a respective shutter to move each shutter to its open position, and the rings providing support for the element and being removable from the casing as a unit with said element.

3. A strainer or filter according to claim 2 and in which one of the rings is adapted to abut said closure member for the casing so that when the closure member is moved into its fully closed position the closure member moves the element together with its rings against said spring bias means thereby effecting opening of said both shutters simultaneously.

4. A strainer or filter according to claim 3 and in which the closure member is in the form of a cap with a quick start thread which engages a corresponding thread on one of the rings supporting the element.

* * * * *